(12) United States Patent
Xiao et al.

(10) Patent No.: US 12,511,819 B2
(45) Date of Patent: Dec. 30, 2025

(54) NEURAL VIEW SYNTHESIS USING TILED MULTIPLANE IMAGES

(71) Applicant: Meta Platforms Technologies, LLC, Menlo Park, CA (US)

(72) Inventors: Lei Xiao, Redmond, WA (US); Douglas Robert Lanman, Bellevue, WA (US); Numair Khalil Ullah Khan, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 141 days.

(21) Appl. No.: 18/437,161

(22) Filed: Feb. 8, 2024

(65) Prior Publication Data
US 2024/0303910 A1 Sep. 12, 2024

Related U.S. Application Data

(60) Provisional application No. 63/450,657, filed on Mar. 7, 2023.

(51) Int. Cl.
*G06T 15/20* (2011.01)
*G06T 7/50* (2017.01)
*G06T 17/20* (2006.01)

(52) U.S. Cl.
CPC ............... *G06T 15/20* (2013.01); *G06T 7/50* (2017.01); *G06T 17/20* (2013.01)

(58) Field of Classification Search
None
See application file for complete search history.

(56) References Cited

U.S. PATENT DOCUMENTS

| | | | |
|---|---|---|---|
| 2014/0071150 A1* | 3/2014 | Fishwick | G06T 15/005 345/589 |
| 2022/0207663 A1* | 6/2022 | Carbonera Luvizon | G06T 5/77 |
| 2023/0196659 A1* | 6/2023 | Luvizon | G06T 9/00 345/427 |
| 2024/0098235 A1* | 3/2024 | Sabater | H04N 13/161 |
| 2024/0282050 A1* | 8/2024 | Strandborg | G06T 7/90 |

* cited by examiner

*Primary Examiner* — Frank S Chen
(74) *Attorney, Agent, or Firm* — Greenberg Traurig, LLP (57) ABSTRACT

A method for generating tiled multiplane images from a source image is disclosed. The method includes obtaining color and depth images. The method also includes extracting a feature map using a first neural network. The method also includes generating masks for a tile using a second neural network based on a corresponding tile of the feature map and corresponding sections of the color and depth images. The method also includes computing depths of a planes corresponding to the tile based on the masks. The method also includes generating a per-tile multiplane image for the tile based on the masks. The method also includes rendering an image using per-tile multiplane images and depths. A system for generating tiled multiplane images from a source image is also disclosed.

20 Claims, 8 Drawing Sheets

Algorithm 1: Differentiable view synthesis using TMPIs. Angled brackets denote pixel indexing.

RenderTMPI ($\mathcal{S}, \mathbf{R}, \mathbf{t}, \mathbf{K}$)

Input  : $(\Gamma(\mathcal{I}), \leq)$: ordered TMPI planes
             $\mathbf{R}$: relative rotation of novel view
             $\mathbf{t}$: relative translation
             $\mathbf{K}$: camera intrinsics
    Output: Novel view $\mathbf{I}_t \in \mathbb{R}^{3 \times H \times W}$     $\mathcal{I}_t \leftarrow \mathbf{0}^{3 \times H \times W}; \mathcal{T}_t \leftarrow \mathbf{1}^{H \times W};$
    foreach $(\alpha, c, d, \mathbf{x}) \in (\Gamma(\mathcal{I}), \leq)$ do
        $\hat{\mathbf{K}} \leftarrow \mathbf{K} - \begin{bmatrix} \mathbf{I} & \mathbf{x} \\ 0 & 1 \end{bmatrix};$
        foreach $\mathbf{u} \in [1, ..., s] \times [1, ..., s]$ do
            $\mathbf{n} \leftarrow [0, 0, 1]^T;$
            $\begin{bmatrix} \mathbf{u}_s \\ 1 \end{bmatrix} \leftarrow \hat{\mathbf{K}}(\mathbf{R} - \mathbf{t}\mathbf{n}^T/d)\hat{\mathbf{K}}^{-1}\begin{bmatrix} \mathbf{u} \\ 1 \end{bmatrix};$
            $w \leftarrow \alpha\langle\mathbf{u}_s\rangle \mathcal{T}_t\langle\mathbf{u}+\mathbf{x}\rangle;$
            $\mathcal{I}_t\langle\mathbf{u}+\mathbf{x}\rangle \leftarrow \mathcal{I}_t\langle\mathbf{u}+\mathbf{x}\rangle + w\, c\langle\mathbf{u}_s\rangle;$
            $\mathcal{T}_t\langle\mathbf{u}+\mathbf{x}\rangle \leftarrow \mathcal{T}_t\langle\mathbf{u}+\mathbf{x}\rangle(1 - \alpha\langle\mathbf{u}_s\rangle);$
        end
    end
    return $\mathbf{I}_t$
end

NEURAL VIEW SYNTHESIS USING TILED MULTIPLANE IMAGES

RELATED APPLICATIONS

This application claims the benefit of, and priority to, U.S. Provisional Patent Application Ser. No. 63/450,657, entitled "Neural View Synthesis Using Tiled Multiplane Images" filed Mar. 7, 2023, which is incorporated by reference herein in its entirety.

TECHNICAL FIELD

This relates generally to image processing, including but not limited to synthesizing views using tiled multiplane images.

BACKGROUND

The task of synthesizing novel views from a single image has useful applications in virtual reality and augmented reality. For view synthesis, a multiplane image (MPI) estimates a scene as a stack of red, green, blue, and alpha (RGBA) layers. An MPI can model complex appearance effects, anti-alias depth errors and synthesize soft edges better than methods that used textured meshes or layered depth images. And unlike neural radiance fields, an MPI can be efficiently rendered on graphics hardware. However, MPIs are highly redundant and require a considerable number of depth layers to achieve plausible results, making them ill-suited for large images.

SUMMARY

Thus, there is a need for systems, methods and devices for view synthesis using tiled multiplane images. Typical scenes have low depth complexity in local image regions. Some embodiments split a single large MPI into small, tiled regions, each with only a few non-sparse depth planes. This representation is sometimes referred to as a tiled multiplane image (TMPI). Described herein is a method for generating a TMPI with adaptive depth planes and occlusion reasoning from RGB input in a single forward pass to achieve 3D photography in the wild. This representation is scalable to large image resolutions, and achieves high-quality, state-of-the-art view synthesis results on indoor and outdoor scenes while using only a fraction of the number of depth planes than a traditional MPI.

Some embodiments use a learning-based framework to compute per-tile MPIs that can be more efficiently computed and stored for novel view synthesis on mobile devices or virtual reality (VR) headsets, when compared to a traditional MPI. The techniques described herein are not restricted to VR headsets. The techniques can be used for 3D photography in general.

(A1) In some embodiments, the solution explained above can be implemented by a method for generating (and rendering) tiled multiplane images from a source image corresponding to a first view. The method includes obtaining color and depth images for the source image. In some embodiments, the depth image includes an inverse depth image. In some embodiments, the source image is a single-plane image. The method also includes extracting a feature map from the color and depth images (e.g., concatenated color and depth images) for the source image using a first convolutional neural network thereby encoding non-local information for the source image in the feature map. The method also includes, for a respective tile of a plurality of tiles of the source image, performing the following steps. The method also includes generating a set of masks for the respective tile using a second neural network that is distinct from the first neural network based on (i) a tile of the feature map corresponding to the respective tile of the source image and (ii) sections of the color and depth images corresponding to the respective tile of the source image. The method also includes computing depths of a plurality of parallel planes corresponding to the respective tile based on the set of masks. The method also includes generating a per-tile multiplane image including a plurality of depth-plane images for the respective tile based at least in part on the set of masks. The method also includes rendering an image corresponding to a second view distinct from the first view using per-tile multiplane images and depths for the plurality of tiles of the source image.

In some embodiments, the depth image for the source image is computed using a monocular depth estimation method.

(A2) In some embodiments of A1, the per-tile multiplane image for the respective tile of the plurality of tiles of the source image is generated by inputting, to a third convolutional neural network that is distinct from the first neural network and the second neural network, the set of masks, the color and depth images, and the tile of the feature map corresponding to the respective tile.

(A3) In some embodiments of A2, the third neural network provides the per-tile multiplane image by obtaining a pixel-wise blend of the source image and a predicted background.

(A4) In some embodiments of A3, the blend weights are predicted based on visibility.

(A5) In some embodiments of A1, rendering the image includes rendering the per-tile multiplane image as a set of textured quads using a rasterization pipeline.

(A6) In some embodiments of A1, the method further includes independently scaling each inverse depth image before inputting the inverse depth image to the first convolutional neural network.

(A7) In some embodiments of A1, the second (per-tile plane-prediction) neural network includes a convolutional neural network.

(A8) In some embodiments of A1, the method further includes identifying the plurality of tiles of the source image by selecting a set of rectangular sliding blocks of a predetermined size and a predetermined stride for the color and depth images.

(A9) In some embodiments of A8, the method further includes identifying a plurality of tiles of the feature map by selecting a set of rectangular sliding blocks of the predetermined size and the predetermined stride for the feature map.

(A10) In some embodiments of A8, the predetermined stride is about ⅞ times the predetermined size.

(B1) In another aspect, a method is provided for generating and rendering tiled multiplane images. The method includes encoding non-local information in tile features for an RGB image based on a depth image for the RGB image from a monocular depth estimator. The method also includes predicting placement of multiplane image planes within each tile using the non-local information. The method also includes generating soft layer masks using the plane predictions. The method also includes generating per-tile multiplane RGBA images by concatenating the soft layer masks to color, inverse depth and feature maps for the RGB image. The method also includes rendering the per-tile multiplane RGBA images using a rasterization pipeline.

(C1) In some embodiments, the solution explained above can be implemented on a wearable device. The wearable devices discussed above in some instances are worn on the user's body (e.g., a hand, an arm, a wrist, or an ankle) and can be used to stimulate areas of the body. Moreover, the wearable device can be in communication with a remote device (e.g., a virtual reality device and/or an augmented reality device, among others), and the wearable device can stimulate the body based on an instruction from the remote device. As an example, the remote device may display media content to a user (e.g., via a head-mounted display), and the remote device may also instruct the wearable device to create haptic stimulations that correspond to the media content displayed to the user and/or other information collected by the wearable device.

In accordance with some embodiments, a computer system includes one or more processors/cores and memory storing one or more programs configured to be executed by the one or more processors/cores. The one or more programs include instructions for performing the operations of any of the methods described herein.

In accordance with some embodiments, a non-transitory computer-readable storage medium has stored therein instructions that, when executed by one or more processors/cores of a computer system, cause the computer system to perform the operations of any of the methods described herein. In accordance with some embodiments, a system includes a wearable device, a head-mounted display (HMD), an external device and a computer system to provide video/audio feed to the HMD and instructions to the wearable device, the HMD, and/or the external device.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures and specification.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

Figure 1:
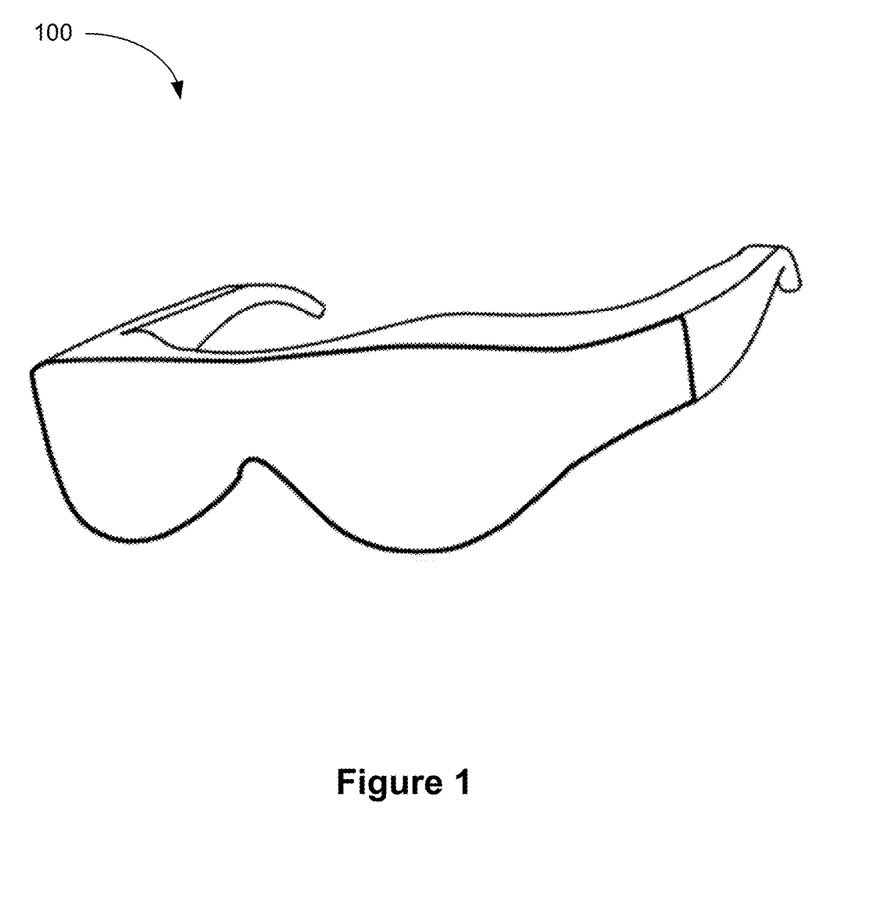
FIG. 1 is a perspective view of a display device in accordance with some embodiments.

FIG. 1 illustrates a display device 100 in accordance with some embodiments. In some embodiments, the display device 100 is configured to be worn on a head of a user (e.g., by having the form of spectacles, eyeglasses, or a visor as shown in FIG. 1) or to be included as part of a helmet that is to be worn by the user. When the display device 100 is configured to be worn on a head of a user or to be included as part of a helmet, display device 100 is called a head-mounted display. Alternatively, the display device 100 is configured for placement in proximity of an eye or eyes of the user at a fixed location, without being head-mounted (e.g., the display device 100 is mounted in a vehicle, such as a car or an airplane, for placement in front of an eye or eyes of the user).

Figure 2:
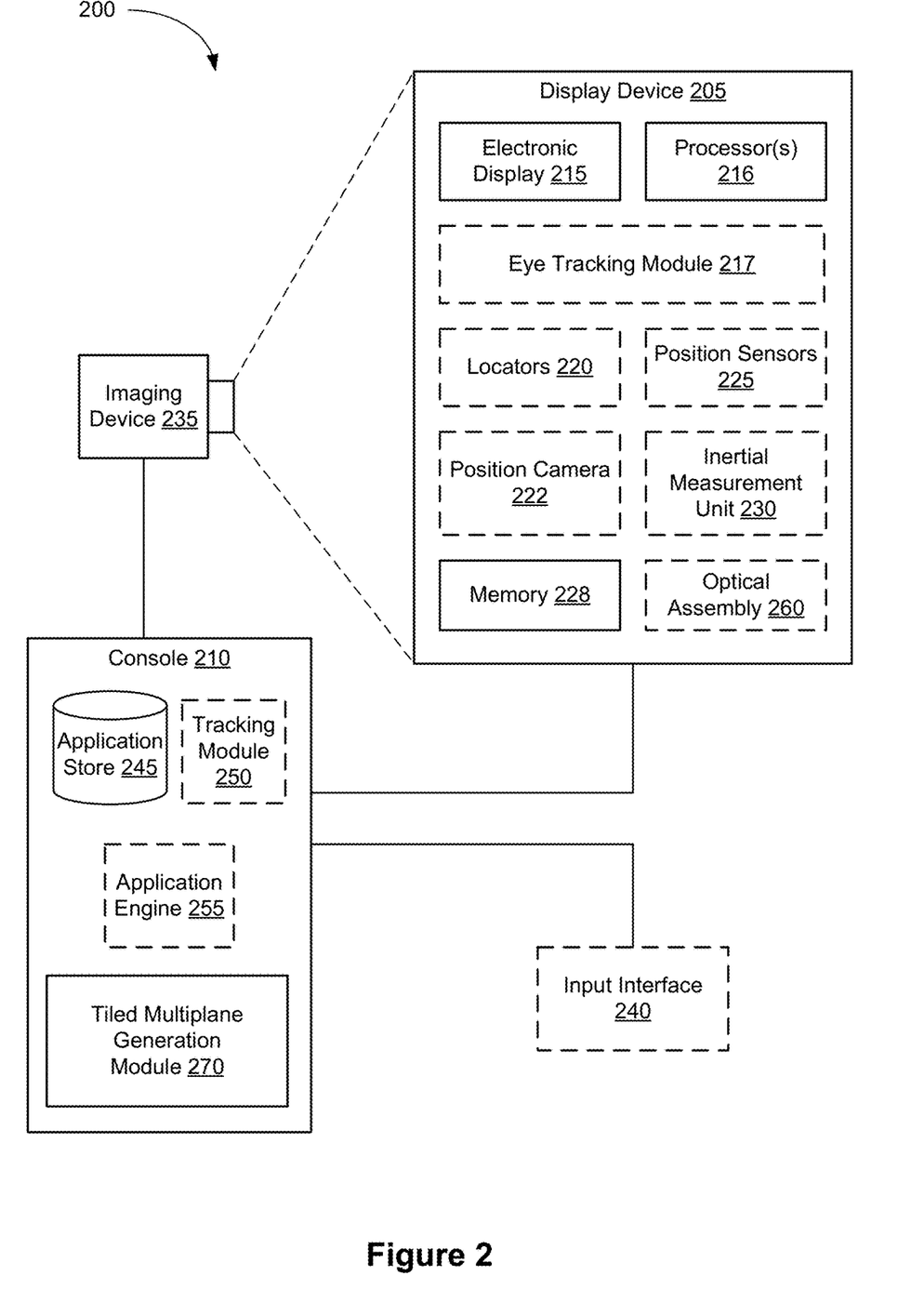
FIG. 2 is a block diagram of a system including a display device in accordance with some embodiments.

In some embodiments, the display device 100 includes one or more components described herein with respect to FIG. 2. In some embodiments, the display device 100 includes additional components not shown in FIG. 2.

FIG. 2 is a block diagram of a system 200 in accordance with some embodiments. The system 200 shown in FIG. 2 includes a display device 205 (which corresponds to the display device 100 shown in FIG. 1, an imaging device 235, and an optional input interface 240 that are each coupled to a console 210. While FIG. 2 shows an example of the system 200 including one display device 205, imaging device 235, and input interface 240, in other embodiments, any number of these components may be included in the system 200. For example, there may be multiple display devices 205 each having associated input interface 240 and being monitored by one or more imaging devices 235, with each display device 205, input interface 240, and the imaging devices 235 communicating with the console 210. In alternative configurations, different and/or additional components may be included in the system 200. For example, in some embodiments, the console 210 is connected via a network (e.g., the Internet) to the system 200 or is self-contained as part of the display device 205 (e.g., physically located inside the display device 205). In some embodiments, the display device 205 is used to create mixed reality by adding in a view of the real surroundings. Thus, display device 205 and system 200 described herein can deliver augmented reality, virtual reality, and mixed reality.

In some embodiments, as shown in FIG. 1, the display device 205 is a head-mounted display that presents media to a user. Examples of media presented by the display device 205 include one or more images, video, audio, or some combination thereof. In some embodiments, audio is presented via an external device (e.g., speakers and/or headphones) that receives audio information from the display device 205, the console 210, or both, and presents audio data based on the audio information. In some embodiments, the display device 205 immerses a user in a virtual reality environment.

In some embodiments, the display device 205 also acts as an augmented reality (AR) headset. In these embodiments, the display device 205 augments views of a physical, real-world environment with computer-generated elements (e.g., images, video, sound, etc.). Moreover, in some embodiments, the display device 205 is able to cycle between different types of operation. Thus, the display device 205 operate as a virtual reality (VR) device, an augmented reality (AR) device, as glasses or some combination thereof (e.g., glasses with no optical correction, glasses optically corrected for the user, sunglasses, or some combination thereof) based on instructions from an application engine 255.

The display device 205 includes an electronic display 215 (also called a display panel), one or more processors 216, an eye tracking module 217, one or more locators 220, one or more position sensors 225, one or more position cameras 222, memory 228, inertial measurement unit 230, and optics 260 (sometimes referred to as optical assembly), or a subset or superset thereof (e.g., the display device 205 with electronic display 215, without any other listed components). Some embodiments of display device 205 have different modules than those described here. Similarly, the functions can be distributed among the modules in a different manner than is described here.

The one or more processors 216 (e.g., processing units or cores) execute instructions stored in the memory 228. The memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 228, or alternately the non-volatile memory device(s) within the memory 228, includes a non-transitory computer readable storage medium. In some embodiments, the memory 228 or the computer readable storage medium of the memory 228 stores programs, modules and data structures, and/or instructions for displaying one or more images on the electronic display 215.

The electronic display 215 displays images to the user in accordance with data received from the console 210 and/or the processor(s) 216. In various embodiments, the electronic display 215 may comprise a single adjustable display element or multiple adjustable display elements (e.g., a display for each eye of a user).

In some embodiments, the display element includes one or more light emission devices and a corresponding array of spatial light modulators. A spatial light modulator is an array of electro-optic pixels, opto-electronic pixels, some other array of devices that dynamically adjust the amount of light transmitted by each device, or some combination thereof. These pixels are placed behind the optical assembly 260. In some embodiments, the spatial light modulator is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The spatial light modulator is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array.

The optics 260 (sometimes referred to as an optical assembly) direct light from the arrays of light emission devices (optionally through the emission intensity arrays) to locations within each eyebox and ultimately to the back of the user's retina(s). An eyebox is a region that is occupied by an eye of a user located proximity to the display device 205 (e.g., a user wearing the display device 205) for viewing images from the display device 205. In some cases, the eyebox is represented as a 10 mm by 10 mm square. In some embodiments, optics 260 include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

In some embodiments, the eye tracking module 217 determines locations of each pupil of a user's eyes. In some embodiments, the eye tracking module 217 instructs the electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is used to also determine location of the pupil. The IR detector array scans for retro-reflection and identifies which IR emission devices are active when retro-reflection is detected. The eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and the eye tracking module 217 maps the locations of the user's pupil while looking at the reference points to corresponding signals received on the IR tracking array). As mentioned above, in some embodiments, the system 200 may use other eye tracking systems than the embedded IR one described herein.

The optional locators 220 are objects located in specific positions on display device 205 relative to one another and relative to a specific reference point on the display device 205. A locator 220 may be a light emitting diode (LED), a corner cube reflector, a reflective marker, a type of light source that contrasts with an environment in which the display device 205 operates, or some combination thereof. In embodiments where the locators 220 are active (i.e., an LED or other type of light emitting device), the locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, the locators 220 are located beneath an outer surface of display device 205, which is transparent to the wavelengths of light emitted or reflected by the locators 220 or is thin enough to not substantially attenuate the wavelengths of light emitted or reflected by the locators 220. Additionally, in some embodiments, the outer surface or other portions of the display device 205 are opaque in the visible band of wavelengths of light. Thus, the locators 220 may emit light in the IR band under an outer surface that is transparent in the IR band but opaque in the visible band.

The imaging device 235 generates calibration data in accordance with calibration parameters received from the console 210. Calibration data includes one or more images showing observed positions of the locators 220 that are detectable by the imaging device 235. In some embodiments, the imaging device 235 includes one or more still cameras, one or more video cameras, any other device capable of capturing images including one or more locators 220, or some combination thereof. Additionally, the imaging device 235 may include one or more filters (e.g., used to increase signal to noise ratio). The imaging device 235 is configured to optionally detect light emitted or reflected from the locators 220 in a field of view of the imaging device 235. In embodiments where the locators 220 include passive elements (e.g., a retroreflector), the imaging device 235 may include a light source that illuminates some or all of the locators 220, which retro-reflect the light towards the light source in the imaging device 235. Second calibration data is communicated from the imaging device 235 to the console 210, and the imaging device 235 receives one or more calibration parameters from the console 210 to adjust one or more imaging parameters (e.g., focal length, focus, frame rate, ISO, sensor temperature, shutter speed, aperture, etc.).

The input interface 240 is a device that allows a user to send action requests to the console 210. An action request is a request to perform a particular action. For example, an action request may be to start or end an application or to perform a particular action within the application. The input interface 240 may include one or more input devices. Example input devices include: a keyboard, a mouse, a game controller, data from brain signals, data from other parts of the human body, or any other suitable device for receiving action requests and communicating the received action requests to the console 210. An action request received by the input interface 240 is communicated to the console 210, which performs an action corresponding to the action request. In some embodiments, the input interface 240 may provide haptic feedback to the user in accordance with instructions received from the console 210. For example, haptic feedback is provided when an action request is received, or the console 210 communicates instructions to the input interface 240 causing the input interface 240 to generate haptic feedback when the console 210 performs an action.

The console 210 provides media to the display device 205 for presentation to the user in accordance with information received from one or more of: the imaging device 235, the display device 205, and the input interface 240. In the example shown in FIG. 2, the console 210 includes an application store 245, a tracking module 250, an application engine 255, and a tiled multiplane generation module 270. Some embodiments of the console 210 have different modules than those described in conjunction with FIG. 2. Similarly, the functions further described herein may be distributed among components of the console 210 in a different manner than is described here.

When the application store 245 is included in the console 210, the application store 245 stores one or more applications for execution by the console 210. An application is a group of instructions, that when executed by a processor, is used for generating content for presentation to the user. Content generated by the processor based on an application may be in response to inputs received from the user via movement of the display device 205 or the input interface 240. Examples of applications include: gaming applications, conferencing applications, video playback application, or other suitable applications.

When the tracking module 250 is included in the console 210, the tracking module 250 calibrates the system 200 using one or more calibration parameters and may adjust one or more calibration parameters to reduce error in determination of the position of the display device 205. For example, the tracking module 250 adjusts the focus of the imaging device 235 to obtain a more accurate position for observed locators on the display device 205. Additionally, if tracking of the display device 205 is lost (e.g., the imaging device 235 loses line of sight of at least a threshold number of the locators 220), tracking module 250 re-calibrates some or all of the system 200.

In some embodiments, the tracking module 250 tracks movements of the display device 205 using second calibration data from the imaging device 235. For example, the tracking module 250 determines positions of a reference point of the display device 205 using observed locators from the second calibration data and a model of the display device 205. In some embodiments, the tracking module 250 also determines positions of a reference point of the display device 205 using position information from the first calibration data. Additionally, in some embodiments, the tracking module 250 may use portions of the first calibration data, the second calibration data, or some combination thereof, to predict a future location of the display device 205. The tracking module 250 provides the estimated or predicted future position of the display device 205 to the application engine 255.

The application engine 255 executes applications within the system 200 and receives position information, acceleration information, velocity information, predicted future positions, or some combination thereof of the display device 205 from the tracking module 250. Based on the received information, the application engine 255 determines content to provide to the display device 205 for presentation to the user. For example, if the received information indicates that the user has looked to the left, the application engine 255 generates content for the display device 205 that mirrors the user's movement in an augmented environment. Additionally, the application engine 255 performs an action within an application executing on the console 210 in response to an action request received from the input interface 240 and provides feedback to the user that the action was performed. The provided feedback may be visual or audible feedback via the display device 205 or the haptic feedback via the input interface 240.

The tiled multiplane generation module 270 includes one or more neural networks (e.g., convolutional neural networks, such as U-net), monocular depth estimator, view generation and/or rendering modules, according to various embodiments. The tiled multiplane generation module 270 also includes memory that stores various inputs and/or data structures for the operation of the different sub-modules. For example, the module includes weights for trained neural networks, color, depth and features maps and/or images, masks, tiles, per-tile multiplane images, background information, blend weights, and/or any other temporary data structures for generating tiled multiplane images, and/or for rendering different views of a source image, according to various embodiments. In some embodiments, the tiled multiplane generation module 270 is used to train the neural networks. Operations of the tiled multiplane generation module 270 are described below in detail, according to some embodiments.

Described herein are methods for synthesizing novel views from a still image, also known as 3D photography. 3D photography is important for VR passthrough. This research area has generated a lot of interest in recent years. However, methods for novel view synthesis do not take the efficiency of representation or computational requirements into account, which makes them ill-suited for real-time systems. Techniques described herein can be used to compute a tiled variant of a multiplane image (MPI) from a single image using a learning-based pipeline to generate high quality novel views. A learning-based pipeline for evaluating the output of each tile is also described herein.

3D photography is based on image-based rendering (IBR). These methods typically rely on interpolation within the convex hull of a large set of images to generate novel views. Some conventional systems use canonical two-plane parameterization of light fields that renders novel views by quadrilinear interpolation. There are also systems that use geometric proxies to improve rendering quality. Some systems use extended interpolation-based view synthesis to unstructured images. However, plenoptic sampling proved that, for large distances, the number of images required for view synthesis by interpolation is impractically high. Consequently, the large majority of recent view synthesis methods have relied on learned priors to overcome the high sampling requirements.

Sampling requirements for view-interpolation are inversely related to the geometric information of the scene. Thus, many methods have relied on coarse geometric proxies to improve view synthesis quality. In one conventional method, this proxy takes the form of a multiplane image (MPI), which is used to achieve interpolation-based view synthesis that overcomes sampling limits. MPIs were used for extrapolating novel views outside the convex hull of the input stereo cameras. An MPI can be viewed as an instance of "stack of acetates" volumetric model. Researchers have provided a theoretical analysis of the limits of view interpolation and extrapolation using MPIs. Researchers have also used learned gradient descent to generate MPIs from multiple views. The MPI concept have been extended to concentric RGBA spheres that can be used for view synthesis in 360 degrees. The discrete RGBA planes of MPIs have been replaced with continuous neural surfaces to achieve higher quality results. In one conventional system, a scale-invariant method is used to lo learn strong data priors that can generate MPIs from a single view. This is sometimes referred to as 3D photography that aims to produce novel views from in-the-wild, single-view images. There are known methods that are MPI-based examples of this approach. However, MPIs are an over-parameterized scene representation. Recent methods have sought to overcome this shortcoming to some extent through a more judicious placement of depth planes. Nonetheless, their high level of redundancy dilates their memory and computational footprint, and limits their wider adoption in mobile and AR/VR applications.

For such use cases, the techniques described herein provide an efficient approach to novel view synthesis. Some embodiments use depth-based warping that is often followed by inpainting. Some embodiments guide inpainting in disoccluded regions of the warped view using a layered depth representation. Some embodiments apply this general approach to 360-degree input. Some embodiments use a depth image to generate a point cloud of neural features which can be projected and rendered in novel views using a generative adversarial network (GAN). Some such embodiments use segmentation to remove the geometric and semantic distortions from a depth image that often reduce the rendering quality of this approach. Nonetheless, depth-based warping methods suffer from hard boundaries and are oversensitive to errors in the depth estimate. While soft layering along with alpha mattes may be used to address this shortcoming, MPIs are inherently capable of handling such artifacts via blending. For view synthesis, neural radiance fields (NeRFs) have recently burgconed in popularity. While great strides are being made in improving the time and data requirements of NeRFs, they remain expensive for interactive applications. Decomposing a single large radiance field into smaller sub-components can improve efficiency. Some embodiments use this methodology for multiplane images.

Figure 3:
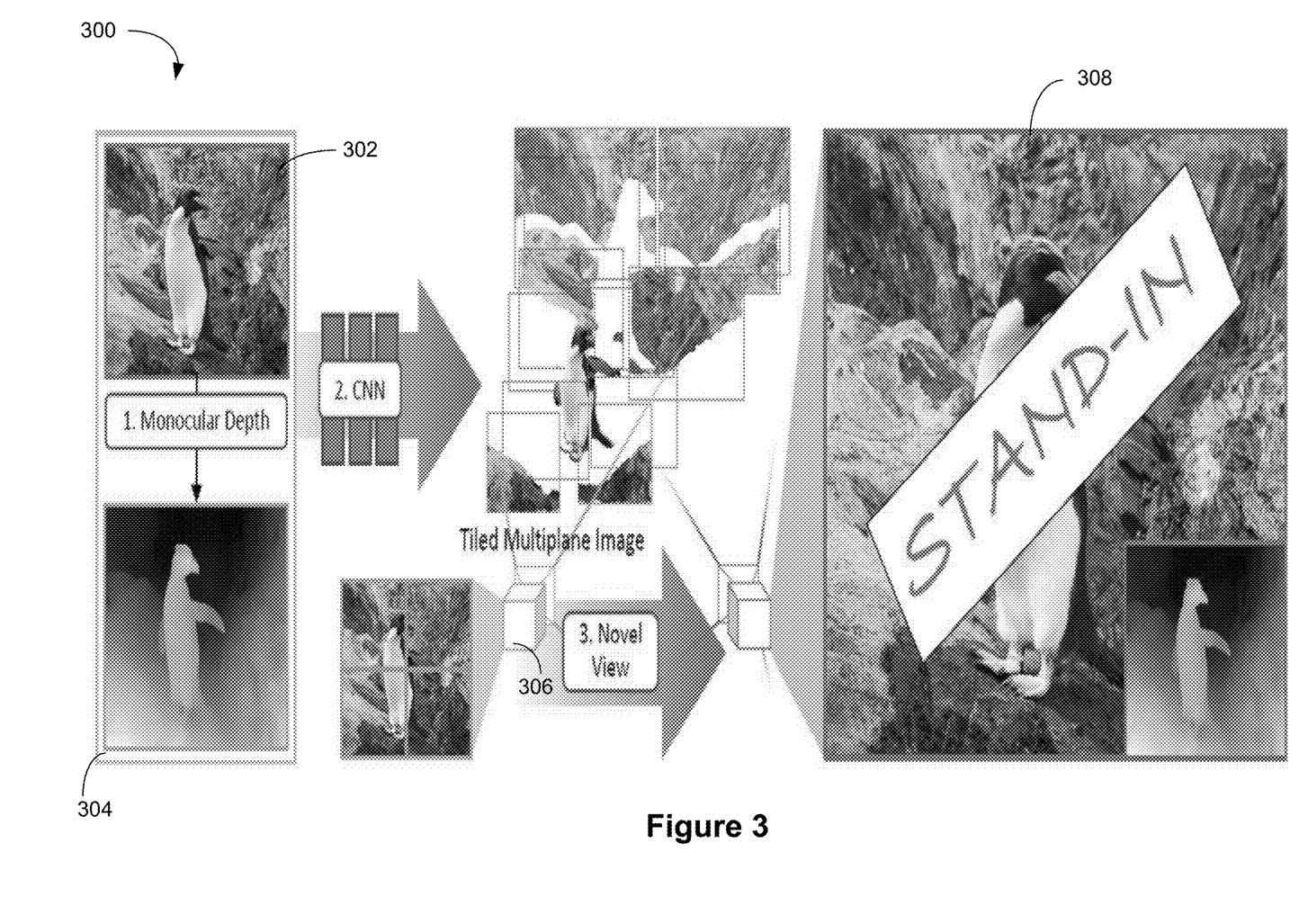
FIG. 3 is a schematic diagram of an example method for 3D photography, according to some embodiments.

FIG. 3 is a schematic diagram of an example method 300 for 3D photography, according to some embodiments. The method may be performed using the tiled multiplane generation module 270. Some embodiments use a single RGB image 302 to estimate (step 1) a monocular depth map 304 to recreate (step 2) the scene as a tiled grid of many small MPIs. FIG. 3 also shows a visualization of an example 2-by-2 tiled grid of MPIs 306, each with three RGBA layers. Novel views are rendered (step 3) by warping and compositing each MPI tile into the target camera's frustum. The 768 by 1152 pixel image shown is generated using a 7 by 11 grid of 4-layer MPIs.

A traditional MPI represents the scene as a set of N fronto-parallel planes in the camera frustum of a reference view I. Each plane is associated with an RGBA image. While it is possible to place the planes at any depth, they are usually arranged linearly in disparity (inverse depth). A novel view $I_t$ is rendered by warping the planes into the target camera's image space via a homography, and compositing them front-to-back using an over operator:

$$I_t = \sum_{i=1}^{N} \left( \alpha_i c_i \Pi_{j=i+1}^{N} (1 - \alpha_j) \right)$$

where $\alpha_i$ and $c_i$ are the warped alpha and color channels, respectively, of the $i^{th}$ plane.

Figure 4:
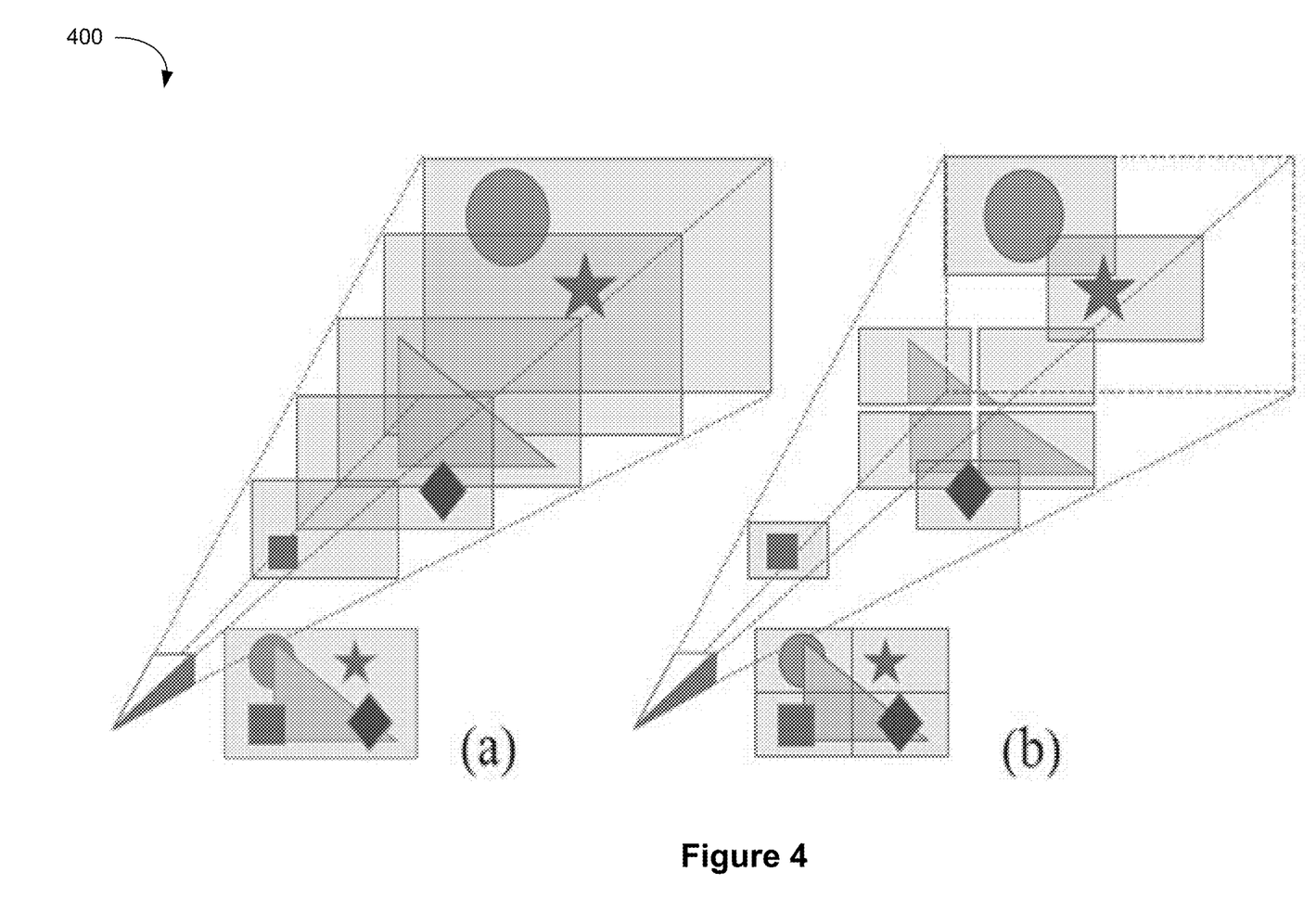
FIG. 4 shows example traditional multiplane image and tiled multiplane image, according to some embodiments.

Both warping and compositing can be done efficiently on graphics hardware allowing real-time rendering of novel views. Moreover, the alpha channel at each plane allows MPIs to represent soft edges and anti-alias any errors in the scene reconstruction, leading to fewer perceptually objectionable artifacts than depth-based warping methods. However, the number of planes N required to capture all the depth variation in a scene is usually large, even though most planes are very sparse. FIG. 4(a) shows an example traditional MPI that uses five planes per pixel to represent a toy scene, even though no region has more than two overlapping objects. Some embodiments overcome this shortcoming by representing the reference image I as a tiled grid of many small MPIs (sometimes referred to as tiled MPI or TMPI), an example of which is shown in FIG. 4(b). A TMPI exploits the low local depth complexity and has only two planes per pixel. Given I and its depth map from a monocular depth estimator, some embodiments predict the placement of n<<N depth planes within each tiled region and use this prediction to generate the RGBA images of the MPI in a single forward pass.

Example Tiled Multiplane Image Representation

In some embodiments, scene representation is based on a set of m tiles, each tile representing a sliding local block of size h at 2D pixel locations $x_1, x_2, \ldots, x_m$ in the source image I. Each tile includes n front-parallel (sometimes referred to as fronto-parallel) RGBA planes, the depth placement of which is not fixed but varies across tiles. $\alpha_j^i$, $c_j^i$, and $d_j^i$ denote respectively the alpha channel, the color channel and depth of the $i^{th}$ plane in the $j^{th}$ tile. Then the tiled multiplane image (TMPI) representation $\Gamma(I)$ of the image is defined as:

$$\Gamma(I) = \{(\alpha_j^i, c_j^i, d_j^i, x_j)\}$$

for all i=1, 2 ..., n and j=1, 2 ..., m. Further, an ordering on this set of 4-tuplets is defined as follows:

$$(\Gamma(I), \leq) = \{(\alpha, c, d, x)_{k=1, \ldots, mn} \mid d_k \leq d_{k+1}\}$$

Figure 5:
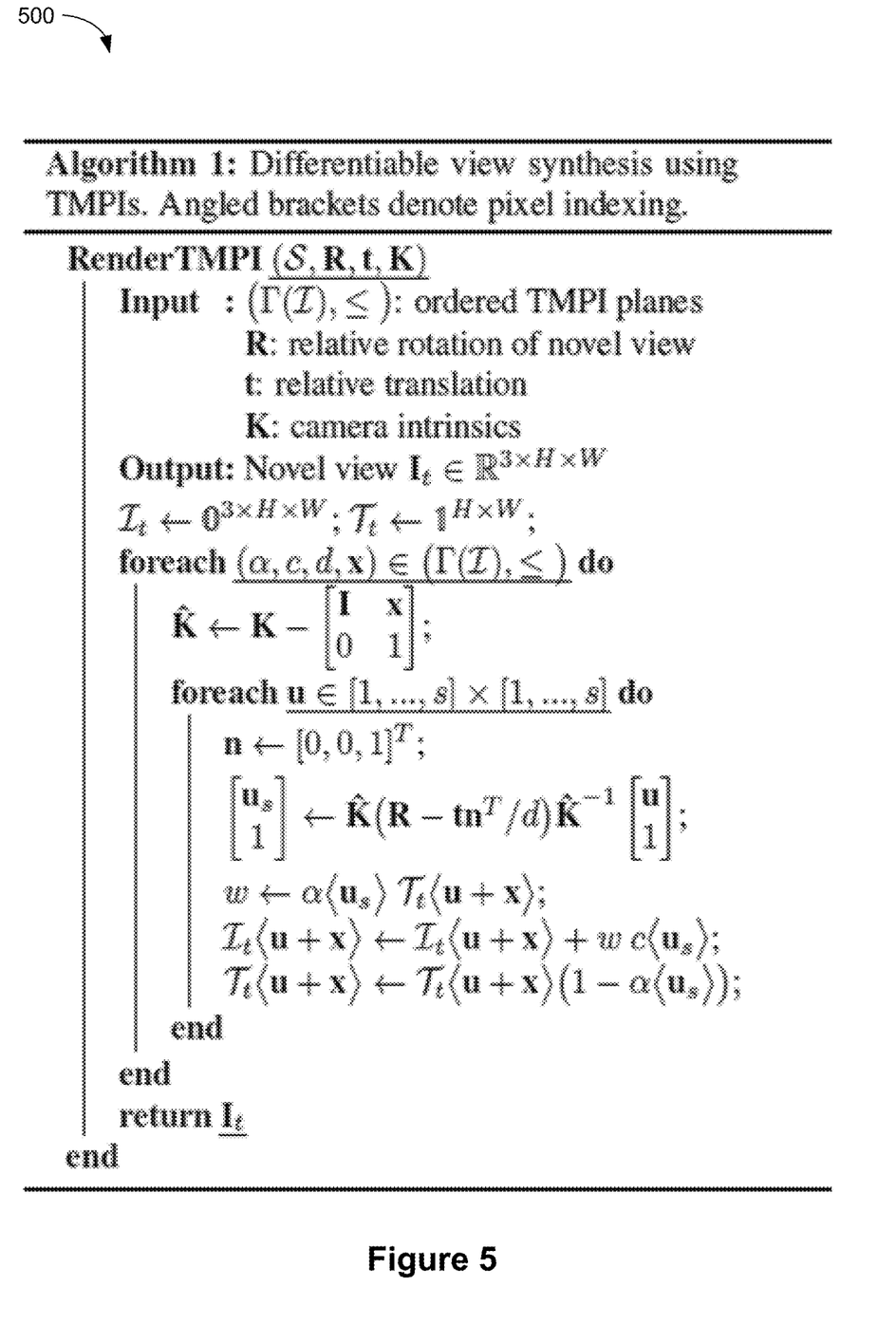
FIG. 5 shows an example algorithm for differentiable view synthesis using tiled multiplane images, according to some embodiments.

In some embodiments, similar to traditional MPIs, novel views are rendered in a differentiable manner by warping all planes into a target camera's image space. However, as the depth of the planes varies across the tiles and, hence, across the pixels of I, a planar inverse warp on the target image plane cannot be directly computed via a homography. Instead, each plane is warped in tile space via a homography computed using a shifted intrinsic matrix, and the warped planes are composited sequentially in the target view at their respective tile locations. While this makes the rendering of tiled multiplane images less efficient and somewhat less elegant than MPIs, this is only true during training when differentiability is required. At inference, the tiles can be rendered efficiently as textured quads using hardware-accelerated Z-buffering and rasterization. FIG. 5 shows an example algorithm 500 (Algorithm 1) for differentiable view synthesis using TMPIs, according to some embodiments. Angled brackets denote pixel indexing. Algorithm 1 can also render a depth map in the target view by replacing $c\langle \bullet \rangle$ with $d\langle \bullet \rangle$.

Example Single-View 3D Photography

Figure 6A:
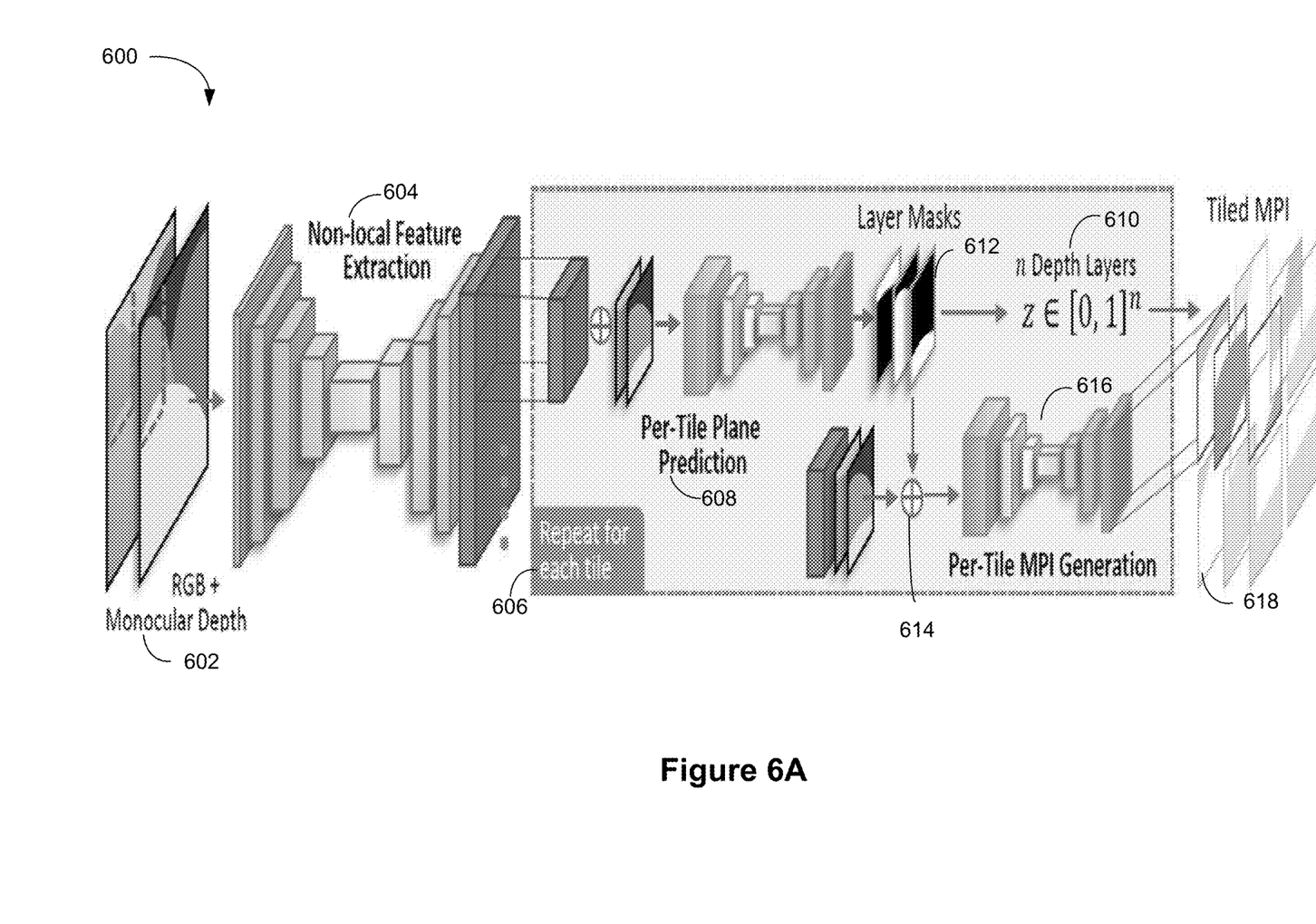
FIG. 6A shows an example process for generating tiled multiplane images, according to some embodiments.

Some embodiments generate tiled multiplane images from a single RGB image. FIG. 6A shows an example process 600 (sometimes referred to as a pipeline) for generating tiled multiplane images, according to some embodiments. The process may be performed using the tiled multiplane generation module 270. Tiled multiplane image generation can be used for single-view 3D photography. Some embodiments obtain an RGB image and a corresponding depth map 602 from a monocular depth estimator. Some embodiments encode non-local information in tile features (non-local feature extraction 604). These tile features are used to predict (608) layer masks 612 that provide the depth of the MPI layers within each tile (depth layers 610). The masks 612 are concatenated (614) to the color, inverse depth, and feature maps, to generate (616) RGBA images of each per-tile MPI 618. This process is repeated (606) for each tile.

Some embodiments split the image plane into a regular tile grid of learnt (sometimes referred to as learned) features. This step is shown in FIG. 5 using label 504. For each tile, a neural network then predicts the depth placement of n fronto-parallel planes. This latter step is motivated by the fact that with a small depth plane budget, the commonly used equal spacing in disparity is wasteful. Thus, a goal is to predict the planes that optimally represent all depth variation within a tile. Using the predicted planes, a fully convolutional network generates the n RGBA images that constitute a per-tile MPI. Unlike an adaptive plane method, some embodiments generate the RGBA images in a single forward pass. The resulting TMPI is rendered as a set of textured quads using the rasterization pipeline of graphics hardware.

Suppose there is a source image $I \in \mathbb{R}^{3 \times H \times W}$, where H and W represent the height and width of the source image, respectively, and $\mathbb{R}$ represents the set of real numbers. Some embodiments obtain a depth map D for the source image using a monocular depth estimation method (sometimes referred to as a monocular depth estimator). A neural network (e.g., U-Net) $\Theta(\bullet)$ then extracts a feature map $F \in \mathbb{R}^{C \times H \times W}$ from the concatenated color and inverse depth images. A goal of these features is to encode non-local information for a per tile plane-prediction and MPI-generation networks further down the pipeline. Each inverse depth image is independently scaled to [0, 1] before being input to $\Theta(\bullet)$. This enforced scale ambiguity avoids sparsity by encouraging each MPI plane to represent some part of the image regardless of absolute depth values. The color, depth and feature maps are unfolded into a set of m square sliding blocks of size h and stride r: $\{(I^i, D^i, F^i)_{i=1, \ldots, m}\}$. Setting r<h allows neighboring tiles to overlap, thereby avoiding gaps and edge artifacts along tile boundaries, and also serving to regularize the output of the per-tile networks across neighbors. However, this also increases the total number of tiles that in turn increases computational requirements. Some embodiments empirically determine a stride value. Some embodiments use r=h−h/8. This provides a good balance between quality and computational efficiency.

In some embodiments, the per-tile plane-prediction network $\Phi(\bullet)$ predicts the n depth planes $\{z_{k=1, \ldots, n}^i\}$ that optimally represent the features of the i-th tile. Conventional methods of spacing the planes linearly in disparity grow inaccurate as n becomes small. One such method places the planes at depth discontinuities identified by peaks in the histogram of processed depth values. However, that method is sensitive to parameter settings and fails for smooth surfaces which have no discontinuities. Accordingly, some embodiments use a neural network $\Phi(\bullet)$ to predict $\{z_k^i\}$. Some embodiments use a learning-based method. Some embodiments use multi-headed self-attention to learn adjustments to an initial linear placement. This method is capable of modeling inter-plane interactions, but it is computationally expensive. Some embodiments directly predict the planes using a convolutional neural network.

Figure 6B:
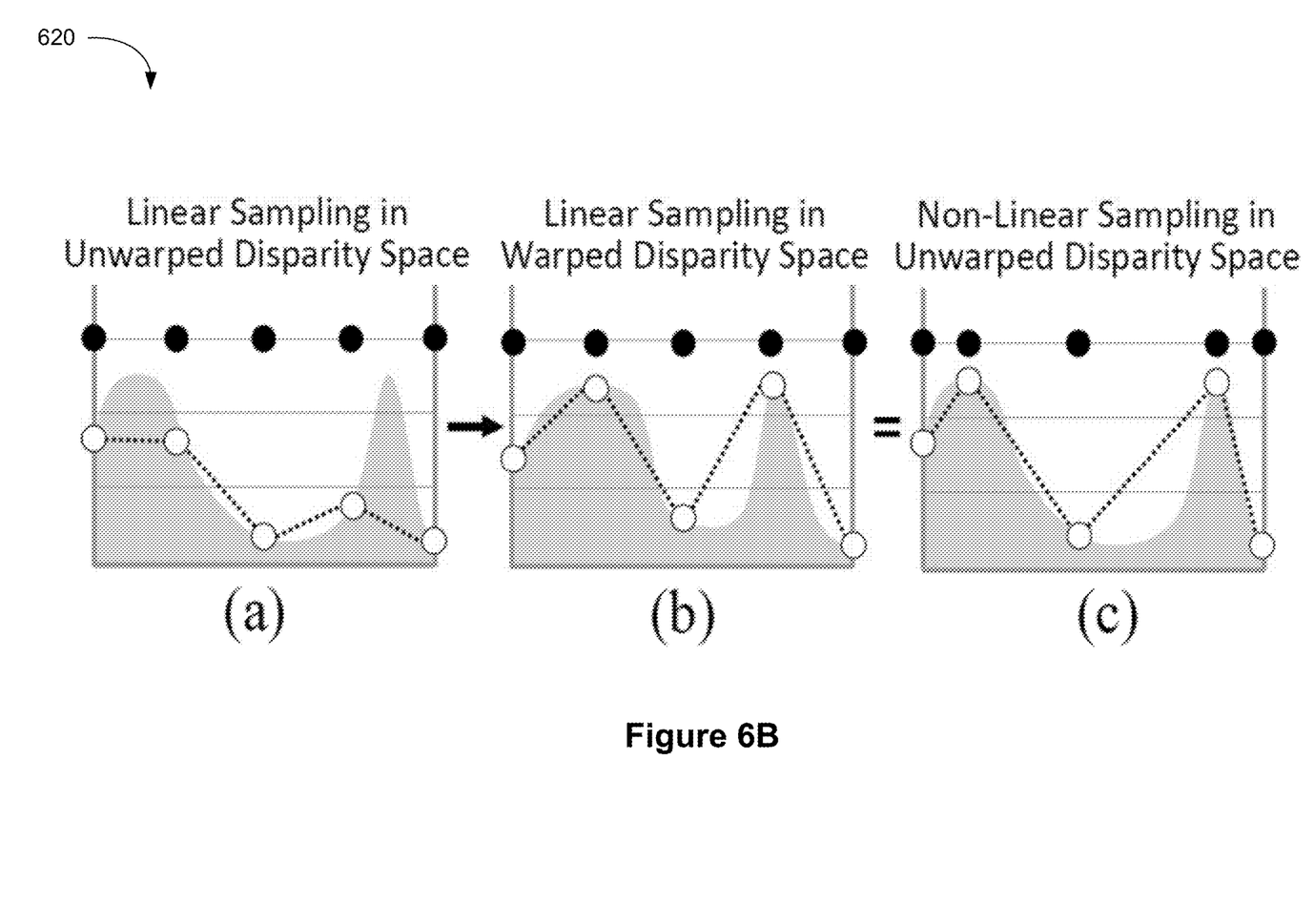
FIG. 6B shows example graph plots for feature accuracy, according to some embodiments.

Some embodiments predict $\{z_k^i\}$ indirectly by generating binary masks $M_k^i \in \mathbb{R}^{h \times h}$ corresponding to the n planes. Some embodiments average the value of each masked region ($M_k^i=1$) in the depth tile $D^i$ to obtain $\{z_k^i\}$. Some embodiments generate the masks (sometimes referred to as layer masks) as the nearest-neighbor discretization of a warped depth tile for $WD^i=\Phi(I^i, D^i, F^i)$ to n linearly spaced values between minimum($WD^i$) and maximum($WD^i$). Some embodiments predict the depth planes as linearly spaced samples in a warped disparity space. This allows directly supervising $\Phi(\bullet)$ using a loss on the discretized representation, and is more stable and easier to train than an adversarial approach. FIG. 6B shows example graph plots 620 for feature accuracy, according to some embodiments. Graph plot (a) corresponds to linear sampling (black circles) of a disparity distribution (shaded region). As shown, linear sampling fails to recreate features accurately (white circles). Graph plot (b) corresponds to a method that predicts MPI planes as linear samples in a learned warped disparity space. Graph plot (c) corresponds to non-linear sampling in the unwarped space.

In some embodiments, the per-tile plane-prediction network $\Phi(\bullet)$ is composed of a convolutional neural network. In some embodiments, the per-tile plane-prediction network $\Phi(\bullet)$ is composed of convolutional and fully connected layers with a sigmoid on the output. The aforementioned scaling of each inverse depth map to [0, 1] means that the sigmoid-activated predictions always lie within the depth range of D, considerably speeding up convergence.

In some embodiments, a second neural network $\Psi(\bullet)$ (e.g., another U-Net) then generates the n RGBA images $\{(\alpha_k^i, I_k^i)\}_{k=1,\ldots,n}$ of the i-th MPI tile using its softmasks, color, inverse depth and feature images. Some embodiments represent the RGBA output as a pixel-wise blend of the input image $I_i$ and a predicted background $B^i$. The blend weights W are predicted based on visibility using the following equations:

$$W_k^i = \Pi_{j>k}(1 - \alpha_j^i)$$

$$I_k^i = W_k^i I^i + (1 - W_k^i) B^i$$

In some embodiments, because alpha at plane $z_n$ is one, $\Psi(\bullet)$ predicts n−1 alpha channels and a single background image per tile.

Example Training Procedure

In some embodiments, the pipeline shown in FIG. 6A is trained end-to-end. Some embodiments use a warp-back strategy to generate pseudo ground truth multi-view training data. This includes warping single-view images into a target camera using monocular depth, and inpainting disocclusion holes with a specially trained network. About 110,000 images of the COCO dataset and a monocular depth method are used to generate source-target training pairs. The training objective includes color, depth, discretization, and inpainting terms. The color term $L_C$ is a combination of a VGG (a deep convolutional neural network), structural similarity, focal frequency, and L1 loss on the synthesized color image $I_t$, weighted using the weight values 0.1, 1.0, 10 and 1.0, respectively. The depth term $L_D$ has an L1 and gradient loss on the synthesized depth map $D_t$ with weights 1.0 and 1.5, respectively. The discretization term is similar to a codebook loss and serves to regularize $\Phi(\bullet)$ and speeds convergence:

$$L_Z = \sum_{i=1}^{m} \|Z(WD^i) - D^i\|_1$$

where Z is the discretization process described above.

The inpainting term $L_I$ encourages the MPI generation network $\Psi(\bullet)$ to learn depth-aware inpainting by explicitly penalizing the background image $B^i$ in disoccluded regions. Suppose $G_{t \to s}$ is the ground truth target image warped into the source frame. A disocclusion mask is defined as $O=1-\exp(-K(G_{t \to s}-I_s))$ and represents the composition of all $B^i$ as B. Then, $L_I$ is defined by the following equation:

$$L_I = \frac{1}{\|In(O>T)\|_o} \|O(G_{t \to s} - B)\|_1 + \|\nabla B\|_1$$

In the equation above, In is the indicator function of the pixels satisfying the enclosed inequality, and the 0-norm counts the number of non-zero values. The second term regularizes the gradient of the background. Some embodiments use K=5 and T=0.7. The final objective function is defined using the following equation:

$$L(I_t) = L_C + L_D + 10. L_Z + 0.3. L_I$$

Some embodiments bootstrap the initial training stages by setting $B^i$ to be a linear combination of $I^i$ and the output of $\Psi(\bullet)$, with the contribution of the network increasing linearly over 10,000 steps.

Example Method for Generating and Rendering Tiled Multiplane Images

Figure 7:
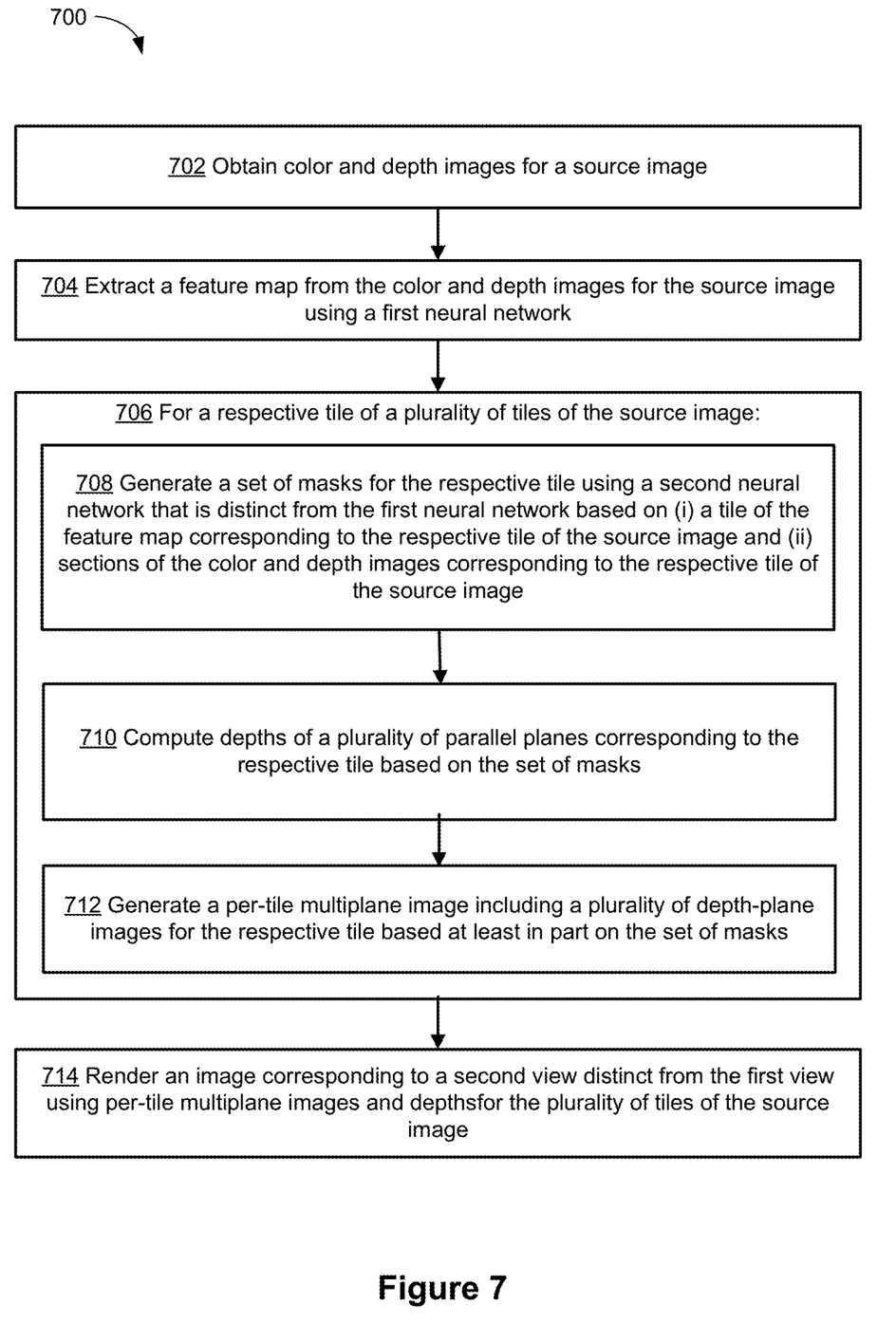
FIG. 7 shows a flowchart for an example method for generating and rendering tiled multiplane images from a source image corresponding to a first view, according to some embodiments.

FIG. 7 shows a flowchart for an example method 700 for generating and rendering tiled multiplane images from a source image corresponding to a first view, according to some embodiments. The method may be performed using the tiled multiplane generation module 270. The method includes obtaining (702) color and depth images for the source image. In some embodiments, the depth image includes an inverse depth image. In some embodiments, the source image is a single-plane image. An inverse depth image (1/depth) is computed from a depth image and is often referred to as a disparity image. Inverse depth images change linearly with distance as opposed to exponentially. Hence, it is common to use inverse depth images as input for stability of optimization. Because of the stability of inverse depth/disparity images, some embodiments use the disparity image. The terms depth/disparity may be used interchangeably in this context as the conversion from one to the other is a simple division.

The method also includes extracting (704) a feature map from the concatenated color and depth images for the source image (or a substantial portion thereof, e.g., at least 50%) using a first convolutional neural network (e.g., U-Net) thereby encoding non-local information for the source image in the feature map (e.g., a respective tile of a plurality of tiles of the feature map includes information from a tile of the source image that does not spatially correspond to the respective tile of the feature map). Some embodiments use vision transformers instead of a convolutional neural network for the feature extraction. Convolutional neural networks are faster than vision transformers and well-suited for spatial data like images.

The method also includes, for a respective tile of a plurality of tiles of the source image (e.g., a tile of the source image corresponds to a particular spatially contiguous region in the source image), performing (706) steps 708, 710, 712 and 714 described below.

The method also includes generating (708) a set of masks for the respective tile using a second (per-tile plane-prediction) neural network that is distinct from the first neural network based on (i) a tile of the feature map corresponding to the respective tile of the source image and (ii) sections of the color and depth images corresponding to the respective tile of the source image.

The method also includes computing (710) depths of (e.g., predicting depth placement of) a plurality of parallel (e.g., fronto-parallel) planes corresponding to the respective tile based on the set of masks (e.g., determine depths of the layers corresponding to the set of masks). Fronto-parallel planes are useful because they always face the camera. Other tilted planes tend to show gaps.

The method also includes generating (712) a per-tile multiplane image including a plurality of depth-plane images for the respective tile based at least in part on the set of masks.

The method also includes rendering (714) an image corresponding to a second view distinct from the first view using per-tile multiplane images for the plurality of tiles of the source image.

In some embodiments, the per-tile multiplane image for the respective tile of the plurality of tiles of the source image is generated by inputting, to a third convolutional neural network (e.g., another U-Net) that is distinct from the first neural network and the second neural network, the set of masks, the color and inverse depth images, and the tile of the feature map corresponding to the respective tile (e.g., this is performed in a single forward pass). In some embodiments, the third neural network provides the per-tile multiplane image by obtaining a pixel-wise blend of the source image and a predicted background. In some embodiments, the blend weights are predicted based on visibility.

In some embodiments, rendering the image includes rendering the per-tile multiplane image as a set of textured quads using a rasterization pipeline (e.g., rasterization pipeline of a graphics hardware; hardware-accelerated Z-buffering and rasterization).

In some embodiments, the method further includes independently scaling each inverse depth image (e.g., scaling to [0, 1]) before inputting the inverse depth image to the first convolutional neural network. This encourages the first convolutional neural network to focus on relative order of surfaces within the depth map not be biased by absolute depth values. Scaling of each inverse depth map to [0, 1] means sigmoid-activated predictions always lie within the depth range of D, considerably speeding up convergence.

In some embodiments, the second (per-tile plane-prediction) neural network includes a convolutional neural network. In some embodiments, the second (per-tile plane-prediction) neural network includes convolutional and fully connected layers with a sigmoid on its output. In some embodiments, the depth image for the source image is computed using a monocular depth estimation method.

In some embodiments, the method further includes identifying the plurality of tiles of the source image by selecting a set of rectangular (e.g., square) sliding blocks of a predetermined size and a predetermined stride for the color and depth images.

In some embodiments, the unfolding avoids gaps and edge artifacts along tile boundaries, regularizes output of per-tile plane-prediction neural network and the second convolutional neural network across neighbors, and reduces a number of tiles, thereby balancing quality and computational efficiency. In some embodiments, the method further includes identifying a plurality of tiles of the feature map by selecting a set of rectangular sliding blocks of the predetermined size and the predetermined stride for the feature map. In some embodiments, the predetermined stride is about ⅞ times the predetermined size.

In some embodiments, the method includes generating and rendering tiled multiplane images. The method includes encoding non-local information in tile features for an RGB image based on a depth map for the RGB image from a monocular depth estimator. The method also includes predicting placement of multiplane image planes within each tile using the non-local information. The method also includes generating soft layer masks using the plane predictions. The method also includes generating per-tile multiplane RGBA images by concatenating the soft layer masks to color, inverse depth and feature maps for the RGB image. The method also includes rendering the per-tile multiplane RGBA images using a rasterization pipeline.

Example Implementations

Some embodiments are implemented based on training on multiple GPUs. Some embodiments use a vectorized implementation of the differentiable TMPI renderer (Algorithm 1). This allows efficient parallel computation.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method for generating tiled multiplane images from a source image corresponding to a first view, the method comprising:
obtaining color and depth images for the source image;
extracting a feature map from the color and depth images for the source image using a first neural network; and
for a respective tile of a plurality of tiles of the source image:

generating a set of masks for the respective tile using a second neural network that is distinct from the first neural network based on (i) a tile of the feature map corresponding to the respective tile of the source image and (ii) sections of the color and depth images corresponding to the respective tile of the source image;
computing depths of a plurality of parallel planes corresponding to the respective tile based on the set of masks; and
generating a per-tile multiplane image including a plurality of depth-plane images for the respective tile based at least in part on the set of masks; and
rendering an image corresponding to a second view distinct from the first view using per-tile multiplane images and depths for the plurality of tiles of the source image.

2. The method of claim 1, wherein:
the per-tile multiplane image for the respective tile of the plurality of tiles of the source image is generated by inputting, to a third neural network that is distinct from the first neural network and the second neural network, the set of masks, the color and depth images, and the tile of the feature map corresponding to the respective tile.

3. The method of claim 2, wherein the third neural network provides the per-tile multiplane image by obtaining a pixel-wise blend of the source image and a predicted background.

4. The method of claim 3, wherein blend weights are predicted based on visibility.

5. The method of claim 1, wherein:
rendering the image includes rendering the per-tile multiplane image as a set of textured quads using a rasterization pipeline.

6. The method of claim 1, further comprising:
independently scaling each depth image before inputting the depth image to the first neural network.

7. The method of claim 1, wherein the second neural network comprises convolutional and fully connected layers with a sigmoid on its output.

8. The method of claim 1, further comprising:
identifying the plurality of tiles of the source image by selecting a set of rectangular sliding blocks of a predetermined size and a predetermined stride for the color and depth images.

9. The method of claim 8, further comprising:
identifying a plurality of tiles of the feature map by selecting a set of rectangular sliding blocks of the predetermined size and the predetermined stride for the feature map.

10. The method of claim 8, wherein the predetermined stride is about ⅞ times the predetermined size.

11. A computer system comprising:
one or more processors; and
memory storing one or more programs for execution by the one or more processors, wherein the one or more programs comprise instructions for:
obtaining color and depth images for a source image;
extracting a feature map from the color and depth images for the source image using a first neural network; and
for a respective tile of a plurality of tiles of the source image:
generating a set of masks for the respective tile using a second neural network that is distinct from the first neural network based on (i) a tile of the feature map corresponding to the respective tile of the source image and (ii) sections of the color and depth images corresponding to the respective tile of the source image;
computing depths of a plurality of parallel planes corresponding to the respective tile based on the set of masks; and
generating a per-tile multiplane image including a plurality of depth-plane images for the respective tile based at least in part on the set of masks; and
rendering an image corresponding to a second view distinct from a first view using per-tile multiplane images and depths for the plurality of tiles of the source image.

12. The system of claim 11, wherein:
the per-tile multiplane image for the respective tile of the plurality of tiles of the source image is generated by inputting, to a third neural network that is distinct from the first neural network and the second neural network, the set of masks, the color and depth images, and the tile of the feature map corresponding to the respective tile.

13. The system of claim 12, wherein the third neural network provides the per-tile multiplane image by obtaining a pixel-wise blend of the source image and a predicted background.

14. The system of claim 13, wherein blend weights are predicted based on visibility.

15. The system of claim 11, wherein:
rendering the image includes rendering the per-tile multiplane image as a set of textured quads using a rasterization pipeline.

16. The system of claim 11, wherein the one or more programs further comprise instructions for:
independently scaling each depth image before inputting the depth image to the first neural network.

17. The system of claim 11, wherein the second neural network comprises convolutional and fully connected layers with a sigmoid on its output.

18. The system of claim 11, wherein the one or more programs further comprise instructions for:
identifying the plurality of tiles of the source image by selecting a set of rectangular sliding blocks of a predetermined size and a predetermined stride for the color and depth images.

19. The system of claim 18, wherein the one or more programs further comprise instructions for:
identifying a plurality of tiles of the feature map by selecting a set of rectangular sliding blocks of the predetermined size and the predetermined stride for the feature map.

20. A non-transitory computer-readable storage medium storing instructions that, when executed by one or more processors of a computer system, cause the computer system to:
obtain color and depth images for a source image;
extract a feature map from the color and depth images for the source image using a first neural network; and
for a respective tile of a plurality of tiles of the source image:
generate a set of masks for the respective tile using a second neural network that is distinct from the first neural network based on (i) a tile of the feature map corresponding to the respective tile of the source image and (ii) sections of the color and depth images corresponding to the respective tile of the source image;

compute depths of a plurality of parallel planes corresponding to the respective tile based on the set of masks; and generate a per-tile multiplane image including a plurality of depth-plane images for the respective tile based at least in part on the set of masks; and render an image corresponding to a second view distinct from a first view using per-tile multiplane images and depths for the plurality of tiles of the source image.

* * * * *